(12) United States Patent
Hu et al.

(10) Patent No.: US 9,065,789 B2
(45) Date of Patent: Jun. 23, 2015

(54) REMOTE COMMUNICATION METHOD

(75) Inventors: Liang Hu, Suzhou (CN); Ruo-Yu Cao, Suzhou (CN)

(73) Assignee: SERNET (SUZHOU) TECHNOLOGIES CORPORATION, Jiangsu (CN)

( * ) Notice: Subject to any disclaimer, the term of this patent is extended or adjusted under 35 U.S.C. 154(b) by 400 days.

(21) Appl. No.: 13/529,213

(22) Filed: Jun. 21, 2012

(65) Prior Publication Data

US 2012/0331072 A1 Dec. 27, 2012

(30) Foreign Application Priority Data

Jun. 24, 2011 (CN) .......................... 2011 1 0171435

(51) Int. Cl.
*G06F 15/16* (2006.01)
*H04L 12/58* (2006.01)
*H04W 4/12* (2009.01)

(52) U.S. Cl.
CPC ............... *H04L 51/063* (2013.01); *H04L 51/38* (2013.01); *H04W 4/12* (2013.01)

(58) Field of Classification Search
CPC ........ H04L 51/063; H04L 51/38; H04W 4/12
See application file for complete search history.

(56) References Cited

U.S. PATENT DOCUMENTS

| 8,547,999 | B2 * | 10/2013 | Sultan et al. | 370/470 |
|---|---|---|---|---|
| 2007/0271247 | A1 * | 11/2007 | Best et al. | 707/3 |
| 2009/0132666 | A1 * | 5/2009 | Rahman | 709/206 |
| 2010/0091757 | A1 * | 4/2010 | Cheng et al. | 370/345 |
| 2010/0091797 | A1 * | 4/2010 | Park et al. | 370/474 |
| 2010/0177831 | A1 * | 7/2010 | Kim et al. | 375/259 |

FOREIGN PATENT DOCUMENTS

| CN | 1933479 A | 3/2007 |
|---|---|---|
| CN | 1968445 A | 5/2007 |

OTHER PUBLICATIONS

Full English (machine) translation of CN1968445 (Published May 23, 2007).
Full English (machine) translation of CN1933479 (Published Mar. 21, 2007).
CN Office Action dated Aug. 5, 2014.

* cited by examiner

*Primary Examiner* — Brian J Gillis
*Assistant Examiner* — Michael A Keller
(74) *Attorney, Agent, or Firm* — Ding Yu Tan

(57) ABSTRACT

A remote communication method is provided. A service end generates a communication message. The service end attaches a first data to the communication message. The first data denotes a content of a first message which comprises a parameter. The service end attaches a second data to the communication message. The second data denotes a content of a second message which is used for substituting the parameter of the content of the first message and for restoring a content of an original message. The service end transmits the communication message containing the first data and the second data to the user end.

16 Claims, 3 Drawing Sheets

| code | message content |
|---|---|
| 0x0001 | PyGTK 2.0 is a set of Python modules which provide a Python interface to GTK+ 2.x |
| 0x0002 | The primary author of PyGTK is [0x0000], Current maintainer of PyGTK is [0x0000] |
| . . . | . . . |
| 0x1000 | %d |
| 0x1001 | James Henstridge james@dda.com.au |
| 0x1002 | abc@abc.com |
| 0x1003 | jerry@yahoo.com |
| . . . | . . . |

REMOTE COMMUNICATION METHOD

This application claims the benefit of People's Republic of China application Serial No. 201110171435.9, filed Jun. 24, 2011, the subject matter of which is incorporated herein by reference.

TECHNICAL FIELD

The disclosure relates in general to a remote communication method, and more particularly to a remote communication method for message transmission.

BACKGROUND

The remote communication technology allows two or more users or two or more systems to achieve communication without restricted by the location of users or systems. Here, "communication" refers to transmission of data conformed to telecommunication protocol in a network, and examples of data are such as messages or data packets.

In the conventional remote communication, the communication message is transmitted in the form of word-string that is readable to human. For example, if the communication message contains the word-string having a lot of characters, then each character will be processed separately and transmitted in a network in a one-by-one manner. According to such method, transmission of communication messages having large message contents occupies not only high processor resource but also large bandwidth, and the normal operation of the device is thus affected.

In another conventional remote communication, codes are used for denoting the communication message containing large communication contents. When the receiver receives codes from a sender, the communication message denoted by the codes may be obtained from a look-up table per agreed between the sender and the receiver. In comparison to a long word-string, a code has a smaller length, and the network data packet size may thus be reduced. However, codes may denote a limited content of message. For example, a 2-bit code may denote four different message contents. Thus, codes are not enough to flexibly denote various message contents, and the application flexibility or expansibility is thus limited.

SUMMARY OF THE DISCLOSURE

The disclosure is directed to a remote communication method enhancing the application flexibility or expansibility of the communication message.

According to an example of the disclosure, a remote communication method applicable to a service end is provided. The service end generates a communication message. The service end attaches a first data to the communication message, wherein the first data denotes a content of the first message which comprises a parameter. The service end attaches a second data to the communication message, wherein the second data denotes a content of the second message which is used for substituting the parameter of the content of the first message and for restoring a content of an original message. The service end transmits the communication message containing the first data and the second data to the user end.

According to another example of the disclosure, a remote communication method applicable to a user end is provided. The user end receives a communication message from a service end, wherein the communication message contains a first data and a second data. The user end analyzes the first data to obtain a content of the first message. The user end analyzes the second data to obtain a content of the second message. The user end identifies the parameter of the content of the first message. The user end substitutes the parameter identified from the content of the first message with the content of the second message to obtain a content of the original message.

It is to be understood that both the foregoing general description and the following detailed description are exemplary and explanatory only and are not restrictive of the disclosed embodiments, as claimed.

DETAILED DESCRIPTION OF THE DISCLOSURE

A number of embodiments are disclosed below for elaborating the disclosure. However, the embodiments of the disclosure are for detailed descriptions only, not for limiting the scope of protection of the disclosure. Furthermore, secondary or unimportant elements are omitted in the accompanying diagrams of the embodiments for highlighting the technical features of the disclosure.

According to the remote communication method disclosed in embodiments of the disclosure, the content of an original message may have two parts. One part contains a parameter and the other part is used for substituting the parameter. Combination of the two parts may be used for restoring/recovering the content of the original message. Through partition and combination of the original message, the application flexibility or expansibility of message communication may thus be enhanced. In some embodiments, codes may reduce data packet size and accordingly increases transmission efficiency.

Figure 1:
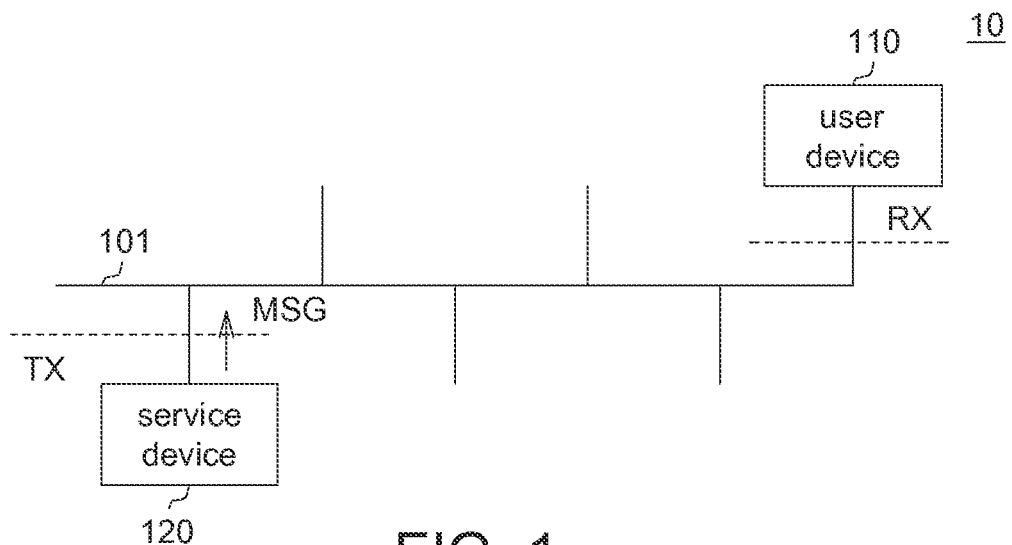
FIG. 1 shows an example of a configuration of a network system.

Referring to FIG. 1, an example of a configuration of a network system is shown. The network system 10 has a user end RX and a service end TX which communicate with each other through a transmission medium 101.

The user end RX has such as a user device 110 and operating software thereof. The user device 110 is realized by such as a personal computer, a network server, or other devices used for communicating with the service end TX.

The service end TX comprises such as a service device 120 and operating software thereof. The service device 120 is realized by such as a device under debug. In an exemplary embodiment, the service device 120 is realized by such as a gateway, a home gateway, a residential gateway, a router, a modem, or other gateway devices. Alternatively, the service device 120 is realized by such as a femtocell base station, or various access point devices supporting various protocols. However, the disclosure is not limited to the above exemplifications. The service device 120 located at the service end TX may be realized by device capable of achieving remote communication with the user end RX.

The transmission medium 101 is realized by such as various wires or optical fiber cables. Alternatively, the transmission medium 101 is realized by such as vacuum or air for transmitting electromagnetic waves. In other words, based on the transmission medium 101, the network system 10 may be realized as a wire network system or a wireless network system. The user end RX and the service end TX, despite being located at different places, still may transmit or receive a communication message MSG or data packets conformed to telecommunication protocols through the transmission medium 101 for implementing remote communication.

The communication message MSG is transmitted within the network system 10. The communication message MSG is such as a debug information. The communication message MSG, such as based on User Datagram protocol (UDP), is transmitted within the IP-based (Internet protocol based) network system 10. However, the disclosure is not limited to the above exemplification, and the communication message MSG may be transmitted through any transmission medium by using any transmission method based on any protocols.

To put it greater details, the communication message MSG has the content of an original message to be attached. The content of the original message is a communication basis between the user end RX and the service end TX. The service end TX receives a control command from the user end RX, generates the communication message MSG according to the content of the original message and further transmits the communication message MSG to the user end RX. The user end RX is used for controlling the content and output of the communication message MSG, receiving the communication message MSG, and further restoring and displaying the content of the original message on a screen of the user end RX. In other words, the service end TX may be regarded as a generator or a sender of the communication message MSG, while the user end RX may be regarded as a requester, a receiver or an analyzer of the communication message MSG. Descriptions of generation and restoration of the communication message MSG are disclosed in a number of exemplary implementations and examples below.

Figure 2:
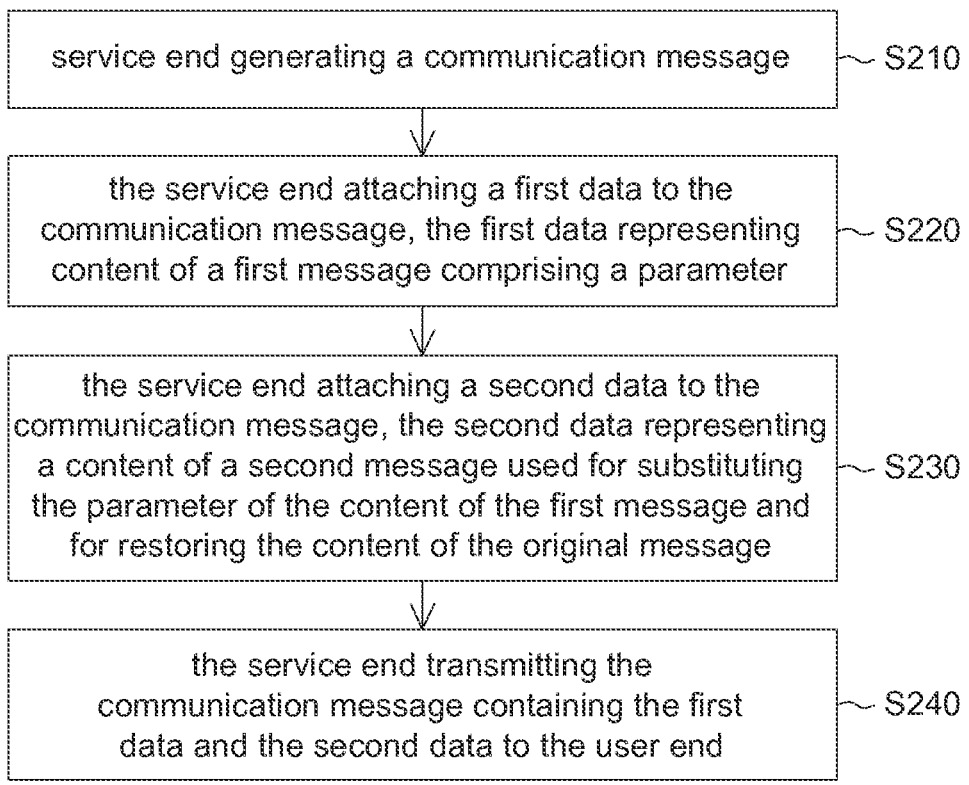
FIG. 2 shows a flowchart of an example of a remote communication method according to one embodiment of the disclosure.

Referring to FIG. 2, a flowchart of an example of the remote communication method according to one embodiment of the disclosure is shown. In the present example, the remote communication method is applicable to the service end TX of FIG. 1. For example, the service device 120 generates and transmits the communication message. The remote communication method is such as implemented by way of software, firmware or hardware in the service device 120 of the service end TX.

The remote communication method of FIG. 2 includes the following steps. In step S210, the service end TX generates a communication message MSG. In step S220, the service end TX attaches a first data to the communication message MSG, wherein the first data denotes a content of the first message comprising a parameter. In step S230, the service end TX attaches a second data to the communication message MSG, wherein the second data denotes a content of a second message used for substituting the parameter of the content of the first message and for restoring the content of the original message. In step S240, the service end TX transmits the communication message MSG containing the first data and the second data to the user end RX.

The aforementioned remote communication method may be regarded as division of message content. In other words, the content of the original message may have two parts. One part contains a parameter and the other part is used for substituting the parameter. Combination of the two parts may be used for restoring the content of the original message. By division of message content, the communication message may contain variable and user-defined contents, for enhancing the application flexibility or expansibility.

Figures 3, 4:
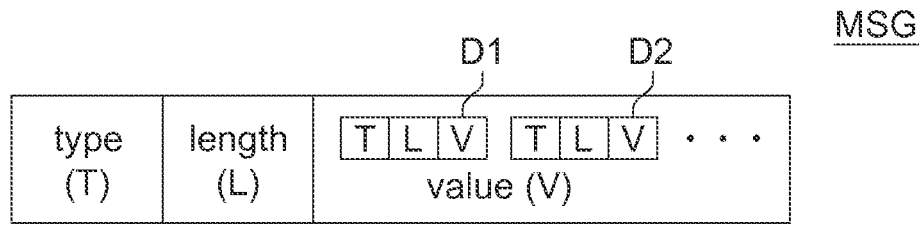
FIG. 3 shows an example of encoding of communication messages.
FIG. 4 shows an example of a code table according to one embodiment of the disclosure.

Referring to FIG. 1, FIG. 2, and FIG. 3. FIG. 3 shows an example of encoding a communication message. Descriptions of each step are disclosed below.

In step S210, the service end TX generates the communication message MSG. As indicated in FIG. 3, the communication message MSG may be encoded as a type-length-value (TLV) code.

The "TLV" code refers to a message encoding method conformed to a data communication protocol. A TLV code normally contains three fields, namely, a type field T, a length field L, and a value field V. The type field T is such as a 2-bit alphanumeric code used for denoting the type of the TLV code. The length field L (in bytes) denotes the length of the value field V. The value field V (in bytes) has data attached to the TLV code.

In some embodiments, each of the type field T and the length field L is 2-byte and they are 32 bits in total. By so, at least $2^{32}$ types of message may be defined. In other embodiments, the type field T and the length field L may define the type and the length of the message by more or fewer bytes. If the message analyzer fails to analyze the type of the message, then the message analyzer may omit the message according to the length of the message, and turns to analyze the next message. Thus, the communication message MSG encoded by TLV has better convenience in terms of use and higher expansibility in terms of application.

In some embodiments, the communication message MSG may be realized as a multi-stage TLV code (such as a two-stage TLV code). As indicated in FIG. 3, the communication message MSG is denoted by a parent-stage TLV code, wherein the value field V thereof is used for storing various data encoded by TLV, and the value field V is thus regarded as a child-stage TLV code. The child-stage TLV codes constitute contents of the communication message MSG such as time, a serial number, importance of this message or software module. The communication message MSG encoded by two-stage TLV code may thus be generated.

The content of the original message contained in the communication message MSG is a word-string readable to human. For some communication message MSG, such as a debugging message, most of the message content is fixed and invariant word-string. If the content of the original message is divided into two parts (that is, a content-fixed part and a content-variant part), the application flexibility or expansibility of message communication will thus be enhanced.

Suppose the content of the original message contained in the communication message MSG is a word-string like: "The primary author of PyGTK is James Henstridge james@dda.com.au, Current Maintainer of PyGTK is abc@abc.com". The content of the original message may be divided into two parts. The content of the first message denotes the fixed content and is encoded as a word-string like: "The primary author of PyGTK is [0x0000], Current Maintainer of PyGTK is [0x0000]." The content of the second message denotes the variant content and is encoded as two word-strings: "James Henstridge james@dda.com.au" and "abc@abc.com". The content of the first message contains two parameters represented by escape characters such as [0x0000]. The number and representation of the parameters may be realized by other implementations. The parameter is used for marking the substitution position of the content of the second message. Thus, the content of the original message may be restored by substituting the content of the second message with the parameter of the content of the first message.

Thus, in the example of implementation, the content of the first message and the content of the second message may be encoded into different data, and attached to the communication message MSG. Thus, after analyzing data, the content of the original message may be restored by combination of the two message contents. Detailed descriptions are disclosed in steps S220 and S230.

In step S220, the service end TX attaches the first data D1 to the communication message MSG. For example, as indicated in FIG. 3, the service end TX encodes the first data D1 as another TLV code and further adds the TLV code to the value field V of the communication message MSG.

In some embodiments, the first data D1 is realized by a code such as an error code. The code of the first data D1 may be formed by several bits for denoting a scenario or an event and such as denoting the content of the first message. By attaching codes to the communication message MSG, the length of the communication message MSG is shortened, data packet size is reduced and the transmission efficiency is increased.

Referring to FIG. 4, an example of a code table according to one embodiment of the disclosure is shown. The code table 20 is used for realizing dictionary type compression. To put it in greater details, each code in the code table 20 corresponds to a word-string of message content. In the present example, the first data D1 is such as a code [0x0002] denoting the aforementioned content of the first message: "The primary author of PyGTK is [0x0000], Current Maintainer of PyGTK is [0x0000]". Thus, the service end end TX may look up the code table 20 to know the code [0x0002] corresponding to the content of the first message. Correspondingly, the user end RX may look up the code table 20 to analyze the code [0x0002] and obtain the corresponding content of the first message.

If the service end TX attaches other code such as the code [0x0001] to the communication message MSG, then the content of this message may be transmitted to the user end RX. The correspondence between the message content and codes stored in the code table 20 may be designed by programmer to fit the users' needs.

In step S230, the service end TX attaches the second data D2 to the communication message MSG. For example, as indicated in FIG. 3, the service end TX may encode the second data D2 as another TLV, and adds into the value field V of the communication message MSG.

In some embodiments, the second data D2 is such as codes for denoting a variable parameter. The code of the second data D2 may be formed by numbers and used for denoting the detailed information of a scenario or event, such as the aforementioned content of the second message. By attaching the code to the communication message MSG, the length of the communication message MSG is shortened, the data packet size is reduced and the transmission efficiency is increased. Moreover, the parameter may be used for carrying detailed contents, and the application flexibility or expansibility may thus be further enhanced.

Referring to FIG. 4. In the present example, the second data D2 are such as the code [0x1001] and the code [0x1002] respectively denoting the content of the second message, that is, "James Henstridge james@dda.com.au" and "abc@abc.com". Thus, the service end TX may look up the code table 20 to know that the content of the second message is related to codes [0x1001] and [0x1002]. Correspondingly, the user end RX may loop up the code table 20 to analyze the code [0x1001] and the code [0x1002] and obtain the corresponding content of the second message.

Also, if the second data D2 are other codes such as [0x1002] and [0x1003], then the second data D2 may be used for denoting different content. Thus, different contents of the second message may be used for substituting parameters of the content of the first message to form different original message, and the application flexibility or expansibility is increased accordingly.

In some other embodiments, the second data D2 is such as a word-string of the content of the second message. In other words, the service end TX may attach each character of the word-string of the content of the second message to the communication message MSG. For identifying the word-string and code data, different numeric values may be added in the type field of the TLV code. The attachment of word-string is not restricted by the variety and number of the code, and by transmission of word-string, the communication message may contain more variable and user-defined contents, largely enhancing the application flexibility or expansibility of message communication. Furthermore, the content of the second message denoted by the second data D2 is normally smaller than the content of the first message, and will not increase data size excessively.

In step S240, the service end TX transmits the communication message MSG containing the first data D1 and the second data D2 to the user end RX. Data D1 and D2 denote two segments of message content from which the analyzer may restore the content of the original message. Thus, the communication message may contain variable and user-define contents, and the application flexibility or expansibility may thus be increased.

Figure 5:
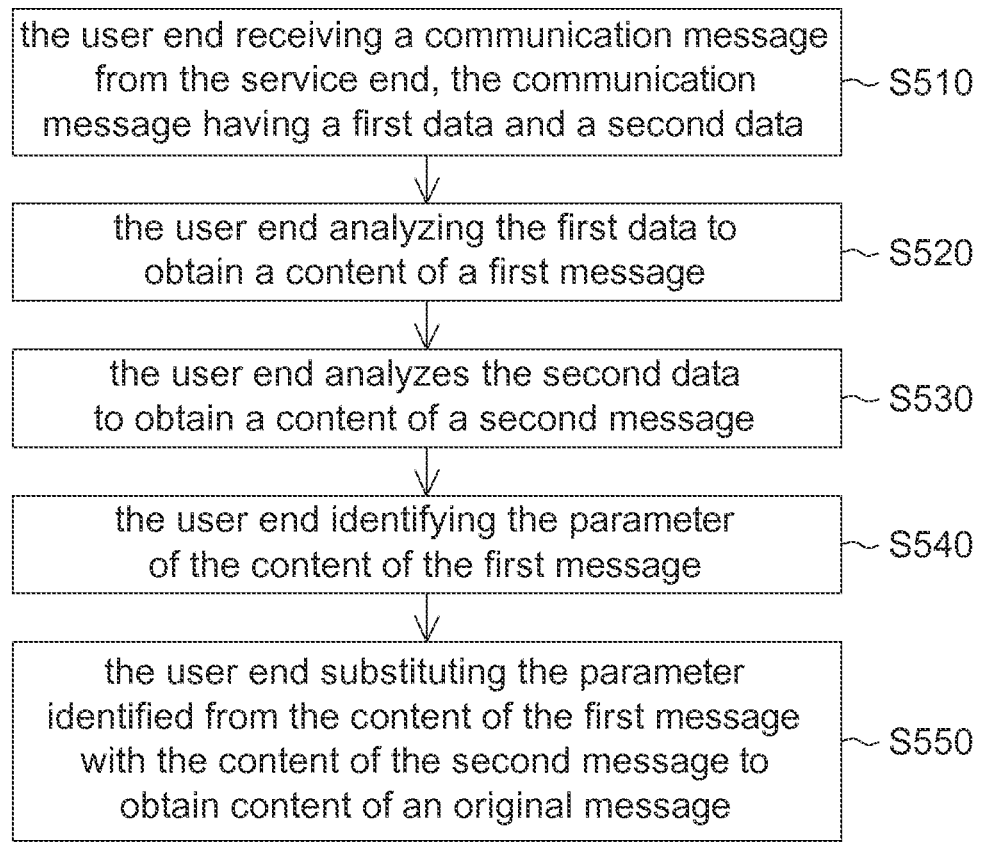
FIG. 5 shows a flowchart of another example of a remote communication method according to one embodiment of the disclosure.

Referring to FIG. 5, a flowchart of another example of a remote communication method according to one embodiment of the disclosure is shown. In the present example, the remote communication method is applicable to the user end RX of FIG. 1. For example, the user device 110 receives or analyzes the communication message if the user device 110 executes the remote communication method. The remote communication method is such as implemented by way of software, firmware or hardware in the user device 110 of the user end RX.

The remote communication method of FIG. 5 includes the following steps. In step S510, the user end RX receives a communication message MSG from the service end TX, wherein the communication message MSG contains a first data and a second data. In step S520, the user end RX analyzes the first data to obtain the content of the first message. In step S530, the user end RX analyzes the second data to obtain the content of the second message. In step S540, the user end RX identifies the parameters of the content of the first message. In step S550, the user end RX substitutes the parameter identified from the content of the first message by the content of the second message to obtain the content of the original message.

The remote communication method of FIG. 5 discloses the reception and restoration of the content of the original message. The remote communication method of FIG. 2 discloses the generation and transmission of the content of the original message. Since the generation and transmission of the content of the original message are corresponding, detailed descriptions of each step of FIG. 5 may be obtained by reference to the steps of FIG. 2, and are not repeated here.

Besides, another embodiment of the disclosure further discloses a computer program product. The computer program product is formed by program segments and may be realized as an application program or stored in a system program. After an electronic device with a buffer memory loads in the program product, the electronic device executes program commands for performing the aforementioned remote communication method of the embodiments. Besides, such computer program product may be a computer readable information storage medium on which at least a program or software is stored, and the program or the software may be used for performing of the aforementioned methods in the above embodiments. The computer readable information storage medium in the embodiment of the disclosure may be realized by such as but not limited to optical information storage medium, magnetic information storage medium or firmware, and may also comprise a program code that may be transmitted via a network or air.

According to the remote communication method and the computer program product disclosed in the embodiments of the disclosure, the content of an original message may be divided into two parts. One part contains a parameter and the other part is used for substituting the parameter. The combination of the two parts may be used for restoring the content of the original message. Division and combination of the original message may enhance the application flexibility or expansibility.

In other possible embodiments, the communication message may be encoded or compressed, such as by dictionary type compression. The fixed part of the content of the original message may be encoded and stored in advance, and the communication message may be denoted by codes (such as multi-bit code). The variable part of the content of the original message may be encoded as a parameter (in the form of escape characters) and stored. Thus, the variant part (such as the parameter), denoted by codes, of the message is transmitted on the network. As the content of the original message to be attached to the communication message may be obtained by looking up a dictionary, the data packet size is decreased and the communication bandwidth may be narrowed.

In other possible embodiments, the parameter may be used for transmitting the variable and user-defined contents, and the application flexibility or expansibility of message communication may thus be enhanced.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A remote communication method applicable to a service end, the method comprising:
   generating a communication message by the service end;
   attaching a first data to the communication message by the service end, wherein the first data denotes a content of a first message which comprises a parameter;
   attaching a second data to the communication message by the service end, wherein the second data denotes a content of a second message, wherein an original message is capable of being fully restored without loss from the second data and the first data, and the content of the second message is configured for substituting the parameter of the content of the first message when restoring the original message;
   wherein, the communication message is encoded into a type-length-value (TLV) code, and the first data and the second data are respectively encoded into a first TLV code and a second TLV code, and added into to a value field of the communication message, the first and second TLV codes are kept intact without loss; and
   transmitting the communication message containing the first data and the second data to a user end by the service end.

2. The remote communication method according to claim 1, wherein, the first data is a code.

3. The remote communication method according to claim 2, further comprising: looking up a code table by the service end to obtain the code corresponding to a word-string of the content of the first message from the code table.

4. The remote communication method according to claim 1, wherein, the second data is a code.

5. The remote communication method according to claim 4, further comprising: looking up a code table by the service end to obtain the code corresponding to a word-string of the content of the second message from the code table.

6. The remote communication method according to claim 1, wherein, the parameter of the content of the first message is an ascii-coded character string comprising escape characters, the second data is a word-string of the content of the second message.

7. The remote communication method according to claim 1, wherein, the parameter is an escape character.

8. The remote communication method according to claim 1, wherein, the communication message is a debugging message.

9. A remote communication method applicable to a user end, the method comprising:
   receiving a communication message from a service end by the user end, wherein the communication message contains a first data and a second data;
   analyzing the first data by the user end to obtain a content of a first message;
   analyzing the second data by the user end to obtain a content of a second message;
   identifying a parameter of the content of the first message by the user end; and
   substituting the parameter of the content of the first message with the content of the second message by the user end to restore entire content of an original message without loss;
   wherein, the communication message is encoded into a type-length-value (TLV) code, and the first data and the second data are respectively encoded into a first TLV code and a second TLV code and added into a value field of the communication message, the first and second TLV codes are encoded and kept without changes.

10. The remote communication method according to claim 9, wherein, the first data is a code.

11. The remote communication method according to claim 10, wherein, the step of analyzing the first data to obtain the content of the first message by the user end comprises: looking up a code table by the user end to obtain the code corresponding to a word-string of the content of the first message from the code table.

12. The remote communication method according to claim 9, wherein, the second data is a code.

13. The remote communication method according to claim 12, wherein, the step of analyzing the second data to obtain the content of the second message by the user end comprises: looking up a code table by the user end to obtain the code corresponding to a word-string of the content of the second message from the code table.

14. The remote communication method according to claim 9, wherein, the second data is a word-string of the content of the second message.

15. The remote communication method according to claim 9, wherein, the parameter of the content of the first message is an ascii-coded character string comprising an escape character.

16. The remote communication method according to claim 9, wherein, the communication message is a debugging message.

* * * * *